July 2, 1935. J. W. MYERS 2,006,509

SIGNAL DEVICE

Filed April 7, 1933

Inventor:
Joseph W. Myers
by his Attorneys
Howson & Howson

Patented July 2, 1935

2,006,509

UNITED STATES PATENT OFFICE 2,006,509

SIGNAL DEVICE

Joseph W. Myers, Philadelphia, Pa., assignor to Procter & Schwartz Electric Co., Philadelphia, Pa., a corporation of Pennsylvania Application April 7, 1933, Serial No. 665,006

5 Claims. (Cl. 177—311)

This invention relates to signal devices for household electrical appliances, such as toasters, waffle irons, flat-irons, etc. The principal object of the invention is to provide a simple and efficient device for signaling the operation of such an appliance to the user thereof.

Another object of the invention is to provide a signal device for such appliances comprising a concealed light source and a novel diminutive light ray distributing device cooperatively associated with the light source and designed to distribute light rays entirely about the appliance so that the signal will be visible to an observer regardless of his position or point of observation.

A further object of the invention is to provide a simple signal device of this nature which is capable of low cost commercial manufacture and which, therefore, does not add materially to the total cost of manufacturing the appliance.

The invention makes use of the well-established rule of physics and optics that when a light ray passes through a light-transmitting medium and strikes the plane or interface between the said medium and a second light-transmitting medium at an angle of incidence equal to or greater than a critical value, total internal reflection takes place and the light ray is reflected back into the first medium. The critical angle of incidence in any instance depends upon the substance of the transmitting medium through which the light passes. I have found that the application of this principle to a di-minutive signal in a household appliance results in a very simple and efficient device.

The invention will be more fully understood from the following detailed description and the accompanying drawing, wherein the invention is illustrated in its specific application to a toaster, although it is equally applicable to other household appliances, as above stated.

Figure 1:
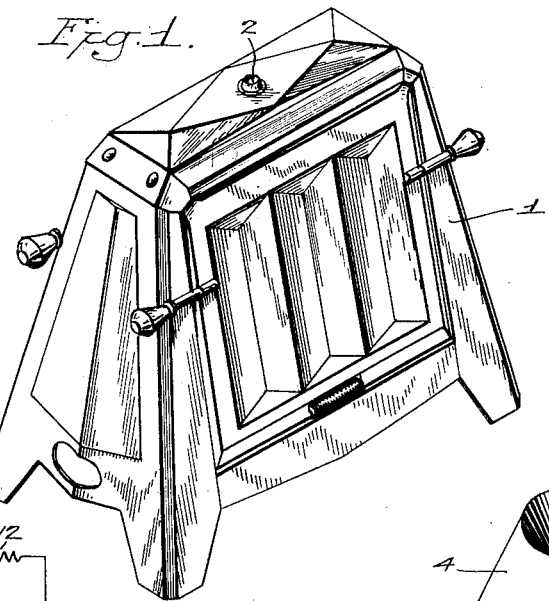
Fig. 1 is a perspective view of a household appliance in the form of a toaster incorporating the device of the invention.

In Fig. 1, a toaster is shown at 1 and the diminutive light ray distributing device is shown at 2. This device is preferably mounted in the illustrated appliance centrally at the top thereof and is disposed within an opening or recess in the top portion of the appliance. The toaster is provided with a light-emitting element which is invisible in Fig. 1 and which preferably takes the form of a coiled incandescent wire included serially in the energizing circuit with the heating element or elements of the appliance.

Figure 2:
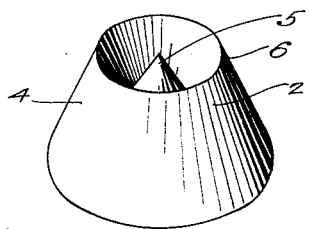
Fig. 2 is a perspective view of the preferred form of light ray distributing device.
Figure 3:
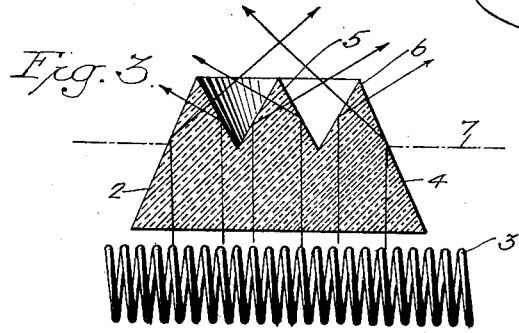
Fig. 3 is a detail view showing the light ray distributing device in section and also showing the light-emitting element in cooperative relation with the said device.

Figs. 2 and 3 show clearly the preferred form of the light ray distributing device and Fig. 3 shows the relative disposition of this device and the light-emitting element 3. It will be noted that the element 3 is disposed immediately below the flat base or bottom surface of device 2. Device 2 has the general contour of a truncated cone having an annular conical surface 4. In addition to this general contour, however, the device has a central cone 5 surrounded by an annular ridge 6. This device may be formed of any suitable light-transmitting material and is preferably formed of glass. By virtue of its construction, the device has a plurality of concentric annular surfaces which are so arranged or designed that the light rays emitted by element 3 and striking these surfaces, strike the surfaces at an angle of incidence greater than the critical angle of the material of which the device is made. By reason of this design of the device, the light rays coming from element 3 are all substantially totally reflected internally of the device and are propagated into the atmosphere entirely about the device and the appliance with which it is associated, so that a user or observer of the signal will be visually apprised of the operation of the appliance regardless of his position about the appliance. In Fig. 3, the internal reflecting action of the light ray distributing device is illustrated by the arrow head lines representing various light rays.

It is essential to the purpose of the invention that the light ray distributing device have at least one annular surface arranged for substantially total internal reflection as above described. It is, of course, desirable that some of the light rays be transmitted to a point or points immediately about the appliance so that the signal will be properly given to an observer who happens to view the appliance from such point or points. I have found that with the device designed for substantially total internal reflection as above described, a sufficient number of light rays will be transmitted directly through the device to serve the last-mentioned purpose, some of these rays passing through the point of the central cone or through the annular edge of the ridge surrounding the cone. In addition to utilizing the underlying principle in an effective manner to achieve the desired purpose, the preferred form of the light ray distributing device has other desirable features. By having a cone surrounded by a ridge, there are provided a number of the desired reflecting surfaces and, at the same time, the pointed cone is protected by the ridge from injury. It might be said that the device comprises a pair of cones in "telescopic" relation.

As previously stated, the light ray transmitting device is partially imbedded, so to speak, in the top of the appliance and the broken line shown at 7 in Fig. 3 illustrates approximately the top line of the appliance. It will be noted that the bottom of the annular recess between cone 5 and ridge 6 is substantially in alignment with the top of the appliance. It will be seen then that a substantial portion of the light ray distributing device is below the top surface of the appliance and only a small portion protrudes above the appliance and is visible. The device is diminutive in size and this, together with its recessed mounting renders it inconspicuous. At the same time, however, the device is highly efficient in performing its intended function.

Figure 4:
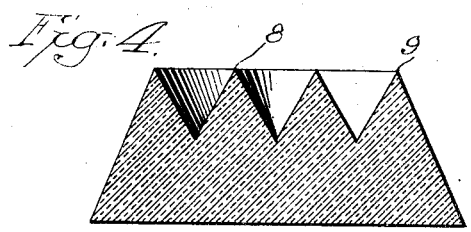
Fig. 4 is a sectional view of an alternative form of the light ray distributing device.

In Fig. 4, there is illustrated an alternative form of the light ray distributing device, which device, in this instance, while having the same general contour as the preferred form, has an inner annular ridge 8 and an outer annular ridge 9 concentrically arranged with respect to the inner ridge. The concentric annular surfaces are, of course, designed for substantially total internal reflection.

While the invention is applicable to any electrically energizable appliance, it is particularly directed to thermostatically controlled appliances in which the heating element or elements is controlled by a thermostatic switch serially connected with the heating element. It is highly desirable in such devices to have a signal indicate the energized or deenergized condition of the appliance so that the user will be apprised of the operation. This is particularly desirable in cooking utensils, especially in toasters and waffle irons in the use of which it is desirable and practically essential that the cooked article be removed immediately upon the completion of the cooking operation. When there is a signal provided, the user is apprised of the cessation of the cooking operation.

Figure 5:
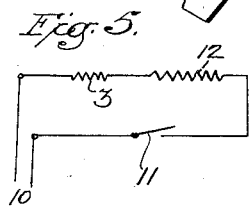
Fig. 5 is a simple diagrammatic illustration of the thermostatically controlled energizing circuit of the appliance shown in Fig. 1, the invention being particularly applicable to such a thermostatically controlled device.

The simple diagram of Fig. 5 illustrates schematically the energizing circuit of such a thermostatically controlled appliance. In this diagram, the input terminals of the appliance are shown at 10, the thermostatic switch is indicated at 11, and the heating element, or elements, is shown at 12. The light-emitting element 3 is serially connected with the heating element and the thermostatic switch. It will be apparent that this element may take any desired form other than that specified herein and, if desired, a portion of the heating element itself may be arranged to serve as the light source instead of having a separate element. I am fully aware that thermostatically controlled appliances embodying a signal are broadly old and I make no claim to this broad idea, but only to the specific signal device disclosed herein in association with an electrical appliance and preferably one of the thermostatically controlled type.

Although the invention has been illustrated and described with reference to a specific application and in only two of its principal forms, it will be apparent that changes or modifications such as those above suggested, or any others which might occur to persons skilled in the art, may be made without departing from the spirit of the invention.

I claim:

1. In a household electrical appliance, such as a toaster, a concealed light source included in the energizing circuit of said appliance to denote the energized or de-energizing condition thereof, and a diminutive translucent light ray distributing device cooperatively associated with said source, and including at least one annular ridge projecting beyond the surface of said appliance, said ridge having converging side walls inclined at an angle such that light rays from said source pass through the material of the ridge and strike the inclined inner surfaces of said ridge at an angle of incidence greater than the critical angle of the material of said ridge to totally reflect said rays internally of said ridge and to propagate said rays into the atmosphere entirely about said device, whereby a relatively large total reflecting area is provided by a relatively small exposed portion of said device.

2. In a household electrical appliance, such as a toaster, a concealed light source included in the energizing circuit of said appliance to denote the energized or de-energizing condition thereof, and a diminutive translucent light ray distributing device cooperatively associated with said source and including a plurality of concentric annular ridges projecting beyond the surface of said appliance and each having converging side walls inclined at an angle such that light rays from said source pass through the material of the several ridges and strike the inclined inner surfaces thereof at an angle of incidence greater than the critical angle of the material of said ridges to totally reflect said rays internally of said ridges and to propagate said rays into the atmosphere entirely about said device, whereby a relatively large total reflecting area is provided by a relatively small exposed portion of said device.

3. In a household electrical appliance, such as a toaster, a concealed light source included in the energizing circuit of said appliance to denote the energized or de-energizing condition thereof, and a diminutive translucent light ray distributing device cooperatively associated with said source and having the general contour of a truncated cone, the base of which is disposed adjacent said source and the top of which projects beyond the surface of said appliance, said device having in its top face a depression, the outer wall defining said depression being inclined and converging with the inclined outer surface of the device to form an annular ridge, said inclined outer surface of said device, and said inclined outer wall defining the depression being inclined at an angle such that the light rays from said source pass through the base and through the material of the ridge and strike the inner surfaces of said ridge at an angle of incidence greater than the critical angle of the material of which the device is made, to totally reflect said rays internally of the device and to propagate said rays into the atmosphere entirely about said device, whereby a relatively large total reflecting area is provided by a relatively small exposed portion of said device.

4. In a household electrical appliance, such as a toaster, a concealed light source included in the energizing circuit of said appliance to denote the energized or de-energizing condition thereof, and a diminutive translucent light ray distributing device cooperatively associated with said source, said device having the general contour of a truncated cone, the base of which is disposed adjacent said source and the top of which projects beyond the surface of said appliance, said device having in its top face a depression, the outer wall defining said depression being inclined and converging with the inclined outer surface of the device to form an annular, marginal ridge, and a cone arranged within the depression and projecting beyond the surface of the appliance, the inclined surfaces of the marginal ridge and the surface of said cone being inclined at an angle such that the light rays from said source pass through the base and through the material of the ridge and cone and strike the inner surfaces of the ridge and the inner surface of the cone at an angle of incidence greater than the critical angle of the material of which the device is made to totally reflect said rays internally of the ridge and cone and to propagate said rays into the atmosphere entirely about said device, whereby a relatively large total reflecting area is provided by a relatively small exposed portion of said device and said cone is protected against injury of said ridge.

5. In a household electrical appliance, such as a toaster, a concealed light source included in the energizing circuit of said appliance to denote the energized or de-energized condition thereof, and a diminutive translucent light ray distributing device cooperatively associated with said source, said device comprising a base portion mounted within the appliance below the surface thereof and having portions projecting from said base and beyond the surface of said appliance, said projecting portions having annular surfaces inclined at an angle such that light rays from said source pass through the base and through the material of the projections and strike the inclined inner surfaces of said projections at an angle of incidence greater than the critical angle of the material of said projections to totally reflect said rays internally of said projections and to propagate said rays into the atmosphere entirely about said device, whereby a relatively large total reflecting area is provided by a relatively small exposed portion of said device.

JOSEPH W. MYERS.